United States Patent Office 3,485,930
Patented Dec. 23, 1969

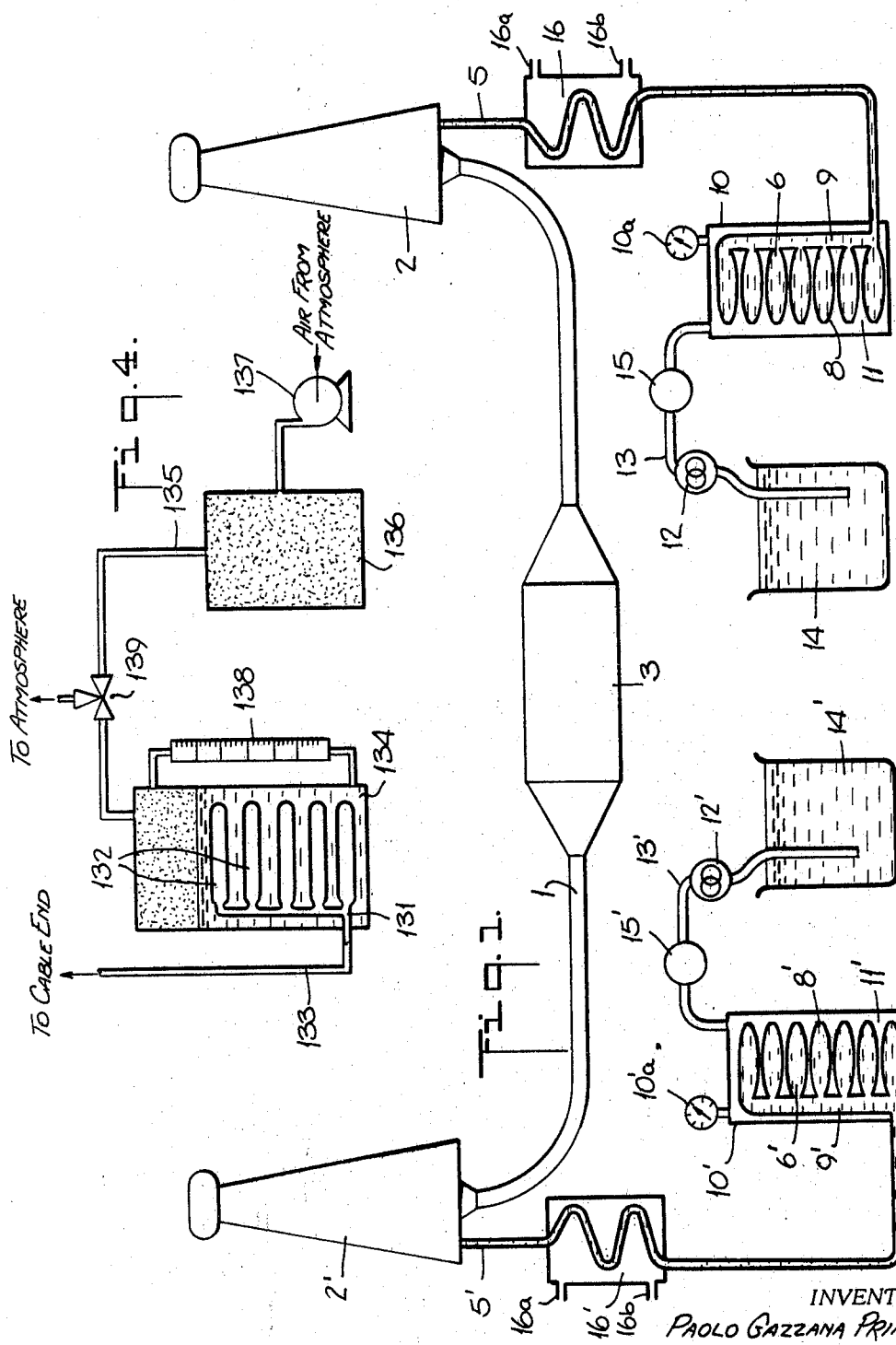

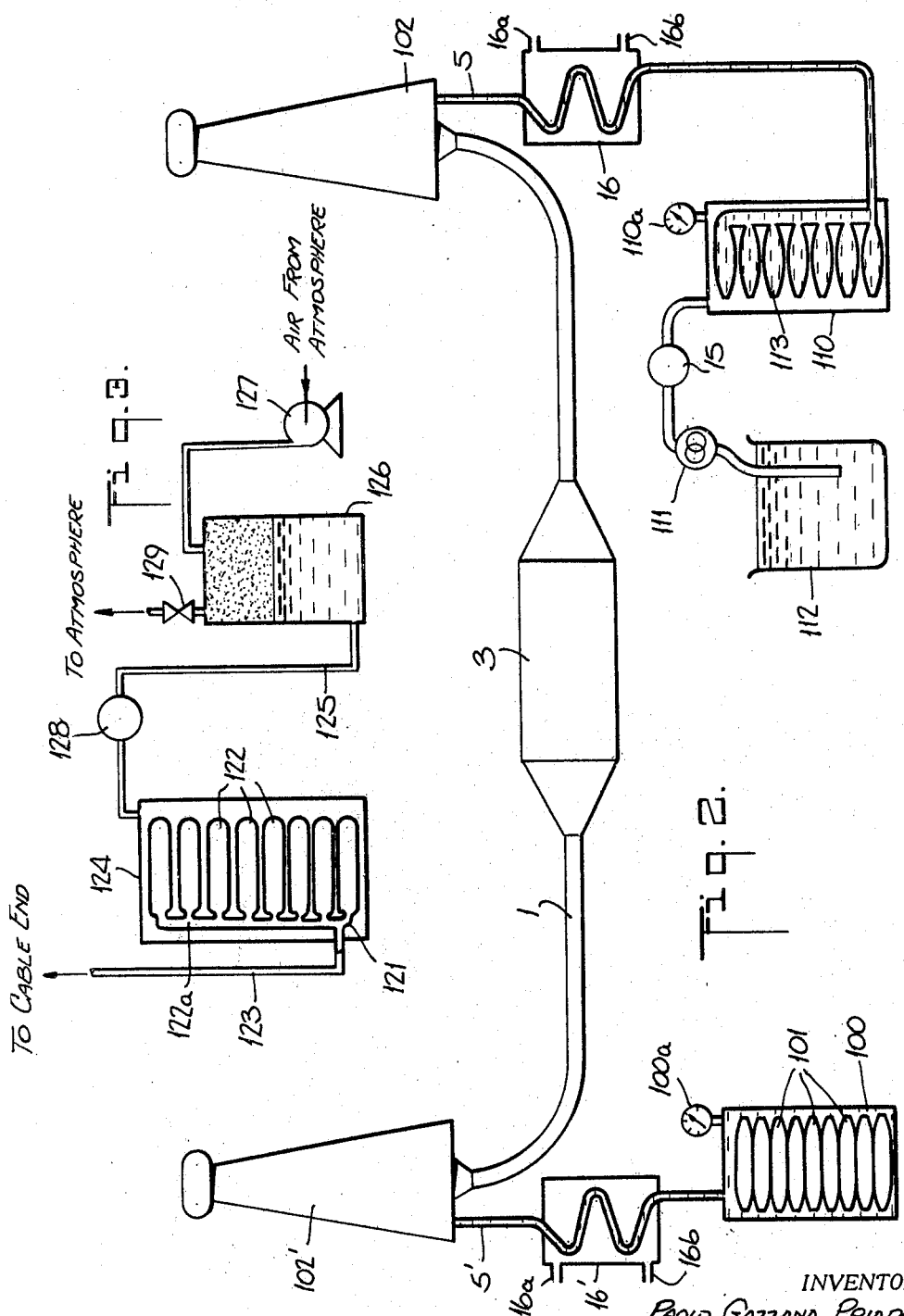

3,485,930
COOLING OF OIL-FILLED ELECTRICAL POWER
CABLES
Paolo Gazzana Priaroggia, Milan, Italy, assignor to
Pirelli S.p.A., Milan, Italy, a corporation of Italy
Filed Dec. 5, 1967, Ser. No. 688,120
Claims priority, application Italy, Dec. 16, 1966,
31,192/66; June 9, 1967, 17,008/67
Int. Cl. H01b 7/34
U.S. Cl. 174—15                    6 Claims

ABSTRACT OF THE DISCLOSURE

Electrical cable insulating oil is circulated through the cable at controlled rate for heat distribution and cooling by applying liquid pressure to deformable oil-filled chambers which are in fluid communication only with the cable.

---

This present invention relates to the cooling of oil-filled, electrical power cables and more particularly it concerns arrangements for achieving such cooling through the controlled circulation of the insulating oil within these cables.

It is known that the conductors of electrical power cables become heated by the current flowing through them as a result of the so-called "Joule effect." Thus, during operation the conductor reaches a temperature which depends upon its electric resistance per unit length, the magnitude of electrical current carried by the cable, the thermal conductivity of the cable insulation, and the ambient conditions where the cable is installed.

In addition to this general heating, the cable may also undergo a localized overheating. This may be due, for instance, to a localized increase in the electric resistance of the cable conductor, (i.e. at the clamps where cable sections are joined), or it may be due to variations in the thermal resistance of the cable insulation, as when there exists an increase in the thickness of the insulating layer in the joints and in the sealing ends of the cable. Overheating in localized regions may also result where there are unfavorable environmental conditions (e.g. such as where the cable sections are laid in stagnant air or in very dry soil).

The current carrying capacity of an electrical cable must be calculated in such a way that the maximum temperature reached by its conductor at the point of maximum localized heating is always lower than a given permissible value (generally equal to 85° C. for oil-filled cables).

To increase the current carrying capacity of a cable without exceeding the temperature allowable for the conductor, it is therefore necessary to provide means capable of removing the largest possible amount of the heat generated in consequence of the Joule effect and/or to eliminate the localized overheating. For this purpose it has been proposed to circulate oil in the central oil duct of the cable conductor. These ducts are always provided in the oil-filled single-core cables to allow for a normal flow of oil between the cable and associated oil-feeding tanks, in order to balance the changes in the cable oil volume due to temperature variations.

The oil circulation problem, however, has very different aspects according to whether its purpose is the general cooling of the cable conductor or whether it is the elimination of localized overheating.

In the case of general cooling the necessary oil flow is quite large, and in fact it may be in the order of 50-100 times the normal balance flow which occurs during the periods in which the cable is subjected to thermal variations. Consequently, a particular construction of the cable and of its accessories is required, both as regards the diameter of the channel or duct for the oil circulation and as regards the permissible value of the pressure inside the cable.

The second case, i.e. the case of localized over-heating, involves a simpler problem, since the necessary oil flow is of somewhat the same order as the balance flow during the periods in which the cable is subjected to thermal variations.

In both cases, however, it is necessary to provide a pump in the oil circuit. This, however, constitutes a weak-point, since in course of time it may permit pollution of the oil or it may give rise to oil leaks or air infiltration into the oil.

To eliminate this disadvantage, it has been proposed to circulate the cable oil between two oil tanks disposed at the cable ends by subjecting the oil in the tank of gas pressure. According to this scheme, the oil is caused to pass through the cable from one tank to the other by alternatively varying the gas pressure in the tanks. This proposed method does not require the use of a pump in the oil circuit; however, it does have the drawback that in order to measure the circulating oil flow, it is necessary to introduce into the oil circuit suitable gauges which constitute a further weak point in the system.

The present invention permits the cooling of electric cables by circulation of oil in a manner such as to avoid the above described drawbacks. Moreover, the present invention may be used both for cooling the whole cable and for eliminating the localized overheating. The present invention does not involve the use of a pump; and yet it permits an immediate reading of the rate of oil flow.

The present invention, in one aspect, achieves cooling of oil-filled high current electrical power cables and sections thereof by alternatively circulating the same cable oil between a first enclosed vessel disposed at one end of the cable and a second enclosed vessel disposed at the other end of the cable. The walls of the vessels are at least in part elastically deformable. Oil circulation is obtained by deforming the deformable portion of the walls to provide a pre-established controlled variation of the volume within at least one of the vessels. This is achieved by varying the ambient pressure outside the deformable walls so as to cause their deformation. The outer pressure is obtained by forcing an appropriate liquid against the outside of the deformable walls.

According to a further aspect of the present invention, there is provided a system by which oil-filled electric cables and/or cable lengths may be cooled according to the above-described method. This system comprises a fluid tight chamber divided into two recesses by means of a deformable wall. One of the recesses is completely filled with cable insulating oil and is placed in fluid communication with the oil ducts within the cable itself. The other recess is also filled with a second liquid in an amount sufficient to cover completely the deformable wall. Means are provided for varying the pressure of the second liquid.

In one embodiment of the invention, the fluid tight chamber comprises an elastically deformable fluid tight vessel positioned at one end of the cable and connected to the oil ducts inside the cable by means of a pipe. The vessel is arranged within a container; and the remainder of the container interior is filled with the second liquid so that the second liquid completely covers the vessel. Another tank, filled with the second liquid under pressure, is connected to the container as by means of a pipe; and means are provided for admitting the second liquid to the container under a given pressure and means for discharging said fluid.

Further specific features and advantages of the invention will be hereinafter more fully set forth with reference to the annexed drawings, showing a presently preferred embodiment of the invention and certain modifications thereof, in which:

FIG. 1 is a diagrammatic representation of a cable cooling system forming one embodiment of the present invention;

FIG. 2 is a diagrammatic representation of a cable cooling system forming a second embodiment of the present invention;

FIG. 3 is a diagrammatic representation of an oil control system for cooling cables according to a further modification of the present invention; and FIG. 4 is a diagrammatic representation of an oil control system for cooling cables according to a still further modification of the present invention.

As shown in FIG. 1, a cable 1 to be cooled is provided with inlet and outlet ends 2 and 2'. For simplicity's sake, the cable is illustrated as an individual hydraulic section and only a single through joint 3 is shown; although others would be provided where several cable sections are to be joined.

Oil is admitted to and released from the cable 1 via the ends 2 and 2'; and is communicated to and from associated vessels 6 and 6' by means of pipes 5 and 5', respectively.

The vessels 6 and 6', which are identical, each comprise several deformable lenticular cells 8 and 8', connected to each other by means of a common manifold 9 and 9'. The manifold in turn is connected via one of the pipes 5 and 5' and one of the cable ends 2 and 2' to the interior of the cable 1, thus placing the cable interior into oil communication with the interior of the cells 8 and 8'. The cells 8 and 8' as shown, are filled with the same oil that passes through the cable 1.

The cells 8 and 8' and their associated manifolds 9 and 9' are disposed within associated containers 10 and 10'. Spaces 11 and 11' exist between the cells and the container interior and these spaces are filled with a suitable liquid, which in the usual case is oil, although this is not necessary. The liquid in the spaces 11 and 11' does not have to have any special electrical properties. The volume of the liquid in the spaces 11 and 11' may be varied by admitting or removing liquid by means of reversible pumps 12 and 12' actuated by motors (not shown).

The pumps 12 and 12' are connected via tubes 13 and 13' to the containers 10 and 10' and to open tanks 14 and 14'. These pumps are operated such that one takes liquid from its associated open tank and discharges it into its associated container while the other takes liquid from its associated container and discharges it into its associated open tank. In this way it is possible to vary the volume of the cells 8 and 8', originating an oil flow from them to the cable or vice-versa. The rate of this flow can be closely controlled and evaluated. This is because the oil flow is equal to the flow through the pumps 12 and 12' which in turn is equal to the rate of flow through the connecting tube between the tank and the container.

Actually, the rate of oil flow can be measured without having to insert any device into the cable to contact with the cabe oil. In fact, it is sufficient merely to insert a suitable gauge 15 into the tube 13.

The pressure of the liquid which is supplied via either of the pumps 12 or 12' to its associated container 10 or 10' is transmitted to the oil within the corresponding vessel 6 or 6'. The magnitude of this pressure depends upon the cable length and on the diameter of the oil duct within the cable. It must, of course, be sufficient to balance the loss of pressure head undergone during the passage of the cable oil between the ends 2 and 2'.

Heat exchangers 16, 16' are disposed along pipes 5 and 5', and coolant fluid may be passed through them via parts 16a and 16b so as to cool the oil passing into and out from the cable ends 2 and 2'.

Operation of the above described system will now be discussed. Assuming the system to be initially at rest condition, the oil circulation takes place as follows: The pump 12 begins to admit oil to its associated container 10, while the pump 12' begins to remove liquid from its associated container 10'. This produces an increase in pressure, $\Delta p^+$, upon the oil contained in the cells 8 of the vessel 6 and a simultaneous reduction of pressure, $\Delta p^-$, upon the oil contained in the cells 8' of the vessel 6'. Therefore, an increase of pressure, $\Delta p^+$, is originated at the end 2 of the cable 1; and a reduction of pressure, $\Delta p^-$, is originated at the end 2'. This initiates a flow of oil through the cable 1 from the end 2 toward the end 2'.

After a suitable length of time (which may be previously ascertained by means of suitable devices in accordance with the rate of flow, or the pressures, or the level of the liquid in the tanks 14 and 14'), the direction of rotation of the pumps 12 and 12' is reversed; and the oil then flows from the cells 8' of the vessel 6' to the cells 8 of the vessel 6 through the cable duct. The pressure values are now reversed, since the pressure is minimum at the cable end 2 at this time. The movement of oil in either direction through the cable 1 is important to ensure that the oil pressure does not fall below the atmospheric pressure; and care should be taken in this connection.

The oil flow cycle is continued with the cable oil completely separated from any other component in the system. In particular, the oil is isolated from rotating elements and sealing means interposed between moving parts and fixed parts. Thus, the possibility of pollution or air infiltration is avoided.

The rate of flow of the oil is directly related to the speed of the pumps 12 and 12'; and this can be adjusted as desired (for instance in accordance with the current passing in the cable). It is possible to measure the rate of oil flow indirectly by evaluating the amount of liquid delivered by the pumps 12 and 12' to the tanks 14 and 14'. The rate of oil flow must have a high value when it is used to obtain a forced cooling of the cable conductor. On the other hand, it can have a small value when it is used merely to eliminate localized overheating (for instance in the ends 2, 2' and through the joint 3).

When the tanks 14 and 14' contain gas instead of liquid, they can be directly connected to the containers 10, 10' through suitable pressure regulators. In such case gas is admitted to each container and is discharged therefrom at a pre-established pressure. Also, the rate of flow of the cable oil can be deduced from the variation in liquid level in each container. This variation corresponds to the volume variation of the vessels 6 and 6' which are completely immersed in the liquid.

An important advantage of the above described method is that it eliminates all problems in respect of providing an oil seal between moving parts and fixed parts, so that pollution of the cable oil is avoided. At the same time it permits the immediate measurement of the rate of flow of the circulating oil.

These sealing problems are actually relegated to the liquid which fills containers 10 and 10'; however, this liquid is not required to be free from gases or polluting substances.

In the alternate embodiment of the invention, which is illustrated in FIG. 2, there is provided a variable pressure feeding tank 100 which is used in place of one of the two previously described vessels, 6 and 6', made up of deformable elements.

There is also provided a deformable fluid tight chamber 101 made up of a plurality of gas filled deformable gas filled cells. The chamber 101 is immersed within cable oil contained within the tank 100; and the tank 100 in turn is connected to the cable end 2'.

It will be appreciated that the volumetric capacity of the tank 100 may effectively be varied; that is, it may contain a volume of oil which is variable within very wide limits, depending upon corresponding variations in the pressure of the oil. The variation in oil volume within the tank 100 is balanced by a contrary variation of gas volume within the cells 101; and this variation in gas volume is inversely proportional to the pressure within the tank. The use of variable pressure tanks for oil-filled cables is advantageous because they permit an automatic balance in the variations in cable oil volume due to the temperature variations, while at the same time keeping the oil always free from any contact with the gas and always under a slightly higher than atmospheric pressure.

The construction at the other end of the cable 1 is similar to that shown in FIG. 1 in that it comprises a deformable oil-filled vessel 113 immersed in liquid contained in a container 110. The vessel 113 is in communication with the cable 1 via a cable end 102. The container 110 in turn communicates via a pump 111 with a tank 112 containing a liquid used to supply pressure to the oil.

The pressure in the tank 100 must be sufficient to maintain at any point along the cable 1, a pressure appreciably higher than atmospheric pressure. This pressure must be maintained to overcome pressure drops due to the oil flow which may originate either by thermal variations or by the action of a pump 111, when this acts to discharge the liquid from container 110.

In operation, the embodiment of FIG. 2 may be assumed to start from rest condition. Liquid is admitted to the container 110, by means of the pump 111 which takes it from tank 112. The oil contained in the vessel 113 is thus placed under pressure. As a consequence of the increase of pressure in the vessel 113, an increase of pressure is originated also at the cable end 102 which is therefore under a pressure higher than the other cable end 102'. Therefore, an oil flow is originated in the cable from the end 102 to the end 102'. The oil flows out from the end 102' into the tank 100. The pressure of this oil increases owing to increase in oil volume within the tank 100. The tank 100, however, is able to receive this oil as the increase of pressure is accompanied by a reduction in the volume of the gas-filled cells 101.

After a suitable time (previously stated to be in accordance with the rate of flow of the oil to be circulated inside the cable), the direction of rotation of the pump 111 is reversed. In consequence of this, liquid flows from container 110 into the tank 112, where, owing to the removal of liquid due to the reversal of the sense of rotation of pump 111, the pressure is reduced and a consequent reduction of the oil pressure inside vessel 113 is originated.

The reduction of the oil pressure in vessel 113 results in a reduction of the oil pressure at the cable end 102. By operating in this manner, it is possible to obtain an oil pressure at the cable end 102' which is greater than that at the cable end 102, so that oil will flow from the end 102' to the end 102. The oil which reaches the end 102 is then discharged into the vessel 113, where it remains since, owing to the removal of liquid from container 110, the volume of the vessel 113 can be increased by virtue of the deformability of its walls.

The cable oil control system shown in FIG. 3 can be used at each end of a cable, or at only one end, if a variable pressure feeding tank is used at the other end. The cable oil is contained in vessel 121 constituted by a plurality of lenticular cells 122 having deformable walls and communicating with one another via a common line 122a. A pipe 123 interconnects the vessel 121 with the internal oil ducts of the cable (not shown). The vessel 121 is immersed in a liquid bath within a container 124. The liquid bath need have no special electric characteristics. The container 124 is maintained in fluid communication, by means of a pipe 125 with a tank 126. The tank 126 also contains a certain quantity of the same liquid filling the container 124. The passage of the liquid from the tank to the container is obtained by increasing the pressure inside the tank; and this in turn is achieved through the admission of compressed air supplied by a compressor 127. The amount of liquid flowing from the tank to the container is measured by means of a liquid flowmeter 128 inserted in the pipe 125. In order to initiate the oil flow from the container 124 to the tank 126, it is only necessary to reduce the pressure inside the tank by opening a valve 129 located on top of the tank.

Since the volume of liquid admitted to, or discharged from, the container 124 is equal to the volume of liquid which flows into the cable, the rate of flow of the liquid between the tank and the container is equal to the rate of flow of oil within the cable.

The modified system of FIG. 4, like that of FIG. 3 may be provided at each end of a cable, or, in the event that a variable pressure feeding tank is used at one end of the cable, the control system need be used only at one end. In the system of FIG. 4 cable oil is contained in a vessel 131 constituted by a plurality of lenticular elements 132 having deformable walls and arranged in communication with each other. The connection between the vessel 131 and the cable oil ducts is carried out by means of a pipe 133. The vessel 131 is positioned within a container 134 so as to be covered over with an appropriate liquid which partially fills the container.

The container 134 is in communication with a tank 136 through a pipe 135. The tank 136 is gas pressurized by means of a compressor 137. A pressure regulator 139 is inserted in the pipe 135. The gas pressure inside the container 134 is varied by controlling the pressure regulator 139. The quantity of oil circulating inside the cable, which is the same as the amount squeezed out of the vessel 131 by the liquid in the container 134, can be ascertained by noting the drop in this liquid level in the container. This in turn is achieved by means of a liquid level sight gage 138 mounted on the side of the container 134.

It will be appreciated that the described method may be applied, in a similar manner independently to each hydraulic section of an oil-filled cable. For example, it may be applied to a cable section between two stop joints, or between a stop joint and a sealing end. Likewise, the same method can be applied to oil-filled multiple core cables, in which the oil does not circulate in the cable conductors, but in suitable ducts obtained between the sheath and the insulated conductors.

Having described the invention with particularity with reference to the preferred embodiment of the same, and having referred to some of the possible modifications thereof, it will be obvious to those skilled in the art, after understanding the invention, that other changes and modifications may be made therein without departing from the spirit and scope of the invention.

What is claimed is:

1. Apparatus for cooling an elongated cable having at least one fluid duct therein extending from a first portion thereof to a second portion thereof remote from said first portion, said apparatus comprising means defining first and second chambers respectively connected in fluid communication with said duct at said first portion and in fluid communication with said duct at said second portion, each of said chambers having a deformable wall permitting an increase and decrease in the volume of the chamber and said chambers and the duct being filled with said fluid, said chambers and the portion of the cable from said first portion to said second portion forming a sealed system which is impervious to the flow of said fluid to externally of said system but permitting flow of said fluid from one said chamber to the other of said chambers, and vice versa, through said duct, means applying pressure to the deformable wall of said second chamber, means defining a further chamber containing at least part of said first chamber and including the deformable wall thereof, and means repeatedly first supplying a fluid to said further chamber at a pressure above the pressure of the fluid in said first chamber for a predetermined time and at a predetermined rate and thereafter, emoving fluid fom said further chamber for a predetermined time and at a predetermined rate and thereafter, removing fluid from said further chamber below that of the fluid in said first chamber, whereby fluid within said first chamber flows out of said first chamber toward said second chamber and thereafter flows out of said second chamber toward said first chamber and repeatedly moves, at different times, in opposite directions along said duct causing cooling of said cable.

2. Apparatus as set forth in claim 1 wherein the fluid in said first and second chambers and said duct is oil.

3. Apparatus as set forth in claim 2 wherein the fluid in said further chamber is a liquid.

4. Apparatus as set forth in claim 2 wherein said fluid in said further chamber is a gas.

5. Apparatus as set forth in claim 1 wherein said means applying pressure to the deformable wall of said second chamber comprises means defining a second further chamber containing at least part of said second chamber and including said deformable wall thereof and means alternately supplying a fluid to said second further chamber at a pressure above the pressure of the fluid in said second chamber during the time fluid is being removed from said first-mentioned further chamber and removing fluid from said second further chamber during the time fluid is being supplied to said first-mentioned further chamber.

6. Apparatus as set forth in claim 1 wherein said system is free of means for measuring the fluid flow therein and said means supplying fluid to said further chamber comprises means for measuring and indicating the flow of fluid into said further chamber.

References Cited

UNITED STATES PATENTS

| | | | |
|---|---|---|---|
| 1,904,423 | 4/1933 | Eby | 174—12 X |
| 1,933,348 | 10/1933 | Shanklin | 174—12 |
| 2,016,247 | 10/1935 | Simmons | 174—12 |
| 2,306,527 | 12/1942 | Daniels | 174—15 |
| 3,019,280 | 1/1962 | Mitsuru Takada | 174—12 |
| 3,083,257 | 3/1963 | Andrews et al. | 174—14 |
| 3,213,929 | 10/1965 | Marshall et al. | 174—15 X |
| 3,216,858 | 11/1965 | Bogoanowski | 134—8 |

FOREIGN PATENTS

| | | |
|---|---|---|
| 450,441 | 8/1948 | Canada. |
| 1,368,448 | 6/1964 | France. |
| 444,856 | 3/1936 | Great Britain. |
| 832,312 | 4/1960 | Great Britain. |
| 904,202 | 2/1954 | Germany. |

LARAMIE E. ASKIN, Primary Examiner

A. T. GRIMLEY, Assistant Examiner

U.S. Cl. X.R.

174—12, 19